(12) United States Patent
Giakouminakis et al.

(10) Patent No.: US 10,447,709 B2
(45) Date of Patent: Oct. 15, 2019

(54) METHODS AND SYSTEMS FOR INTEGRATING RECONNAISSANCE WITH SECURITY ASSESSMENTS FOR COMPUTING NETWORKS

(75) Inventors: Anastasios Giakouminakis, Allendale, NJ (US); Chad Loder, Los Angeles, CA (US); Richard Li, Somerville, MA (US)

(73) Assignee: Rapid7, Inc., Boston, MA (US)

( * ) Notice: Subject to any disclaimer, the term of this patent is extended or adjusted under 35 U.S.C. 154(b) by 0 days.

(21) Appl. No.: 12/980,524

(22) Filed: Dec. 29, 2010

(65) Prior Publication Data

US 2012/0174228 A1 Jul. 5, 2012

(51) Int. Cl.
*G06F 21/00* (2013.01)
*H04L 29/06* (2006.01)
*G06F 21/57* (2013.01)

(52) U.S. Cl.
CPC ........ *H04L 63/1416* (2013.01); *G06F 21/577* (2013.01); *H04L 63/1441* (2013.01)

(58) Field of Classification Search
CPC ............. H04L 63/1408; H04L 63/1416; H04L 63/1441; G06F 21/57; G06F 21/577
USPC .............................................. 726/22, 23, 25
See application file for complete search history.

(56) References Cited

U.S. PATENT DOCUMENTS

| | | | | |
|---|---|---|---|---|
| 7,908,660 | B2* | 3/2011 | Bahl | G06F 21/577 726/25 |
| 8,239,668 | B1* | 8/2012 | Chen | H04L 63/1408 706/45 |
| 8,484,725 | B1* | 7/2013 | Telafici | G06F 21/564 713/1 |
| 2003/0188189 | A1* | 10/2003 | Desai | H04L 63/104 726/23 |
| 2004/0102923 | A1* | 5/2004 | Tracy | G06F 21/577 702/181 |
| 2004/0172557 | A1* | 9/2004 | Nakae | H04L 63/0227 726/22 |
| 2005/0235358 | A1* | 10/2005 | Keohane et al. | 726/23 |
| 2005/0265351 | A1* | 12/2005 | Smith | H04L 12/4641 370/395.2 |
| 2007/0214151 | A1* | 9/2007 | Thomas et al. | 707/10 |
| 2008/0127338 | A1* | 5/2008 | Cho et al. | 726/22 |
| 2011/0093955 | A1* | 4/2011 | Chen | G06F 21/577 726/25 |

* cited by examiner

*Primary Examiner* — Jahangir Kabir
(74) *Attorney, Agent, or Firm* — Ashwin Anand (57) ABSTRACT

A reconnaissance and assessment (RA) tool can receive base information about the network, such as basic network information and details about an entity and personnel associated with network. The RA tool can utilize the base information to perform reconnaissance procedures on the network to identify the attack surface of the network. The RA tool can perform reconnaissance on the network, itself, and on other external sources, such as third party databases, search engines, and partner networks. Once the attack surface is identified, the RA tool can automatically perform appropriate security assessments on the attack surface. Additionally, if additional information is determined about the network during the security assessments, the RA tool can perform additional reconnaissance and security assessments based on the additional information.

6 Claims, 4 Drawing Sheets

METHODS AND SYSTEMS FOR INTEGRATING RECONNAISSANCE WITH SECURITY ASSESSMENTS FOR COMPUTING NETWORKS

FIELD

Aspects of the disclosure relate generally to computer security.

DESCRIPTION OF THE RELATED ART

In today's distributed computing environments, security is of the utmost importance. Due to the rise of wide-area public networks, users have unlimited access to content, e.g. data, files, applications, programs, etc., from a variety of sources. Additionally, the users' connection to the public networks provides a window for malicious entities to attack the user's computing systems. Malicious entities utilize this ease of accessibility and anonymity to attack the users. For example, the malicious entities can plant viruses, Trojans, or other malicious agents in publicly available content in order to attack the users' computing systems and steal sensitive information from the users and can attack the users' system remotely across the public networks.

To identify security risks in computing systems and networks, users and administrators employ vulnerability assessment and security assessment tools. These tools, however, are limited in their effectiveness because they rely on the users and administrators to identify the computing systems and network components, which need to be assessed. As such, these tools can only detect security threats in the computing systems and networks identified by the users and administrators. This presents a problem in today's computer networks. Because computer networks contain large number of components that are constantly changing, the computer networks often contain "forgotten" components. These "forgotten" components are computing systems, hardware, websites, email addresses, etc. that the users and administrators fail to realize still exist in the computer network. Thus, when the users and administrators utilize existing assessment tools, these "forgotten" components are never considered in the security assessment because the users and administrators no longer know about the "forgotten" components and fail to direct the tools to assess the "forgotten" components.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION

For simplicity and illustrative purposes, the principles of the present teachings are described by referring mainly to exemplary embodiments thereof. However, one of ordinary skill in the art would readily recognize that the same principles are equally applicable to, and can be implemented in, all types of information and systems, and that any such variations do not depart from the true spirit and scope of the present teachings. Moreover, in the following detailed description, references are made to the accompanying figures, which illustrate specific exemplary embodiments. Electrical, mechanical, logical and structural changes may be made to the exemplary embodiments without departing from the spirit and scope of the present teachings. The following detailed description is, therefore, not to be taken in a limiting sense and the scope of the present teachings is defined by the appended claims and their equivalents.

Embodiments of the present teachings relate to systems and methods for integrating reconnaissance and security assessments for networks of computing systems. In particular, a reconnaissance and assessment (RA) tool can receive base information about the network, such as basic network information and details about an entity and personnel associated with network. The RA tool can utilize the base information to perform reconnaissance procedures on the network to identify the attack surface of the network. The RA tool can perform reconnaissance on the network, itself, and on other external sources, such as third party databases, third party search engines, and partner networks. Once the attack surface is identified, the RA tool can perform security assessments on the attack surface. Additionally, if additional information is determined about the network during the security assessments, the RA tool can perform additional reconnaissance and security assessments based on the additional information.

By integrating reconnaissance and security assessment, the RA tool can gather a complete picture of the network before running the security assessment. As such, the RA tool can identify and assess "forgotten," unrecorded, or unidentified components of the network which may be unknown to users and administrator of the network. Thus, RA tool can improve the overall security assessment of the network. Moreover, by utilizing information found during the security assessments to perform additional reconnaissance and security assessments, the RA tool can feed the information back into the reconnaissance in order to locate unrecorded or unidentified components not located and considered during typically security assessments.

Figure 1:
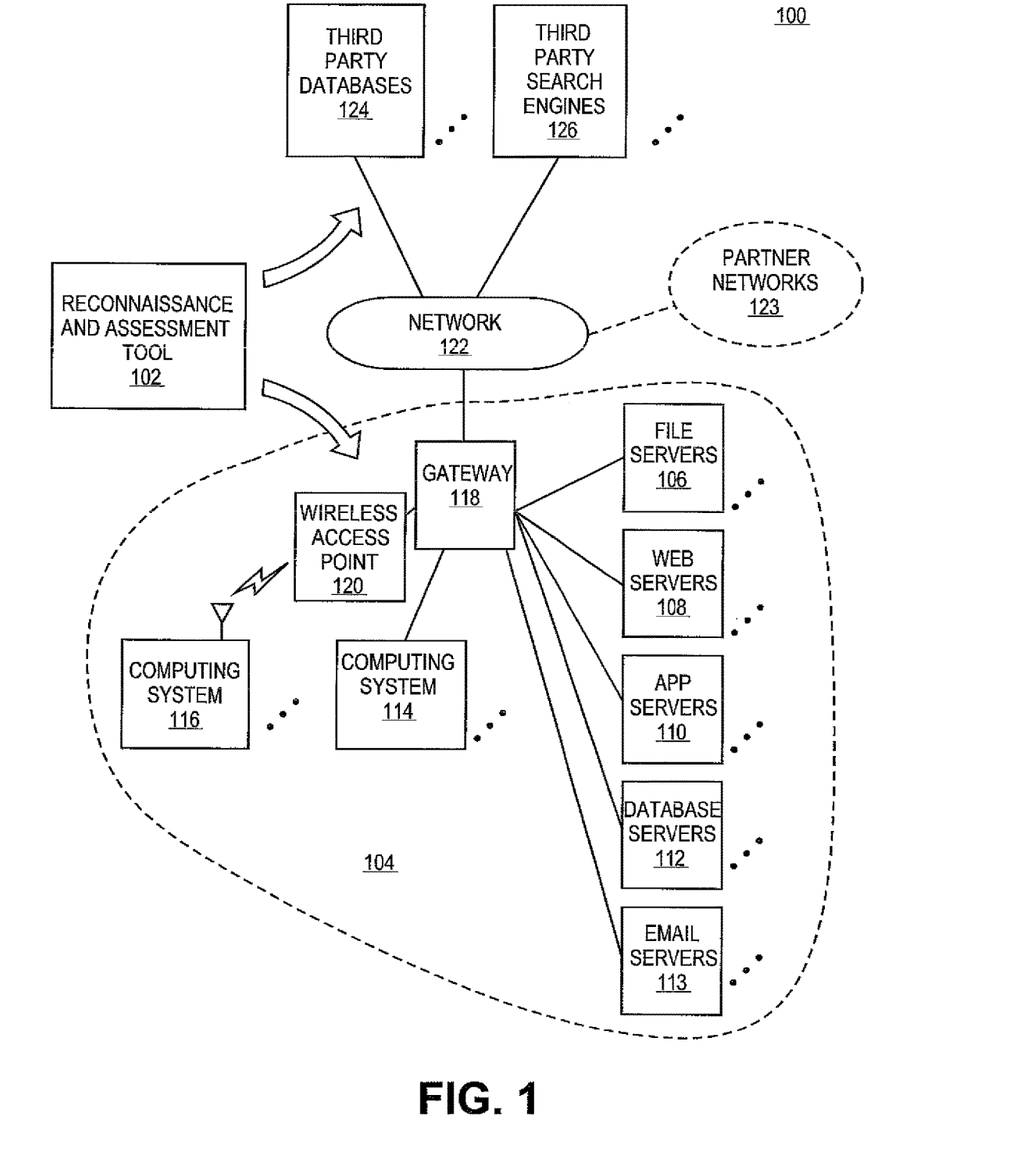
FIG. 1 is block diagram of an exemplary environment in which a reconnaissance and assessment tool can be utilized, according to various embodiments.

FIG. 1 illustrates an exemplary environment 100 in which a reconnaissance and assessment (RA) tool 102 can identify the attack surface of a network environment 104, which potentially pose a security risk to the network environment 104, and can perform security assessments on the attack surface. While FIG. 1 illustrates various systems contained in the environment 100, one skilled in the art will realize that these systems are exemplary and that the environment 100 can include any number and type of systems.

As illustrated in FIG. 1, the network environment 104 can represent the computing systems and network hardware of public or private entities, such as governmental agencies, individuals, businesses, partnerships, companies, corporations, etc., utilized to support the entities. For example, as illustrated in FIG. 1, the network environment 104 can includes various types of servers such as file servers 106, web servers 108, application servers 110, database servers 112, and email servers 113. Likewise, the network environment 104 can include computing systems 114 and 116, which can be any type of conventional computing systems, such as desktops, laptops, etc, used by the personnel of the entities. The computing systems in the network environment 104 can include hardware resources, such as processors, memory, network hardware, storage devices, and the like, and software resources, such as operating systems (OS), application programs, and the like.

The network environment 104 can include other types of conventional network hardware such as gateways, routers, wireless access points, and the like that support any type of communications networks, such as wide-area networks or local-area networks whether wired or wireless, to allow the computing systems in the network environment to communicate. For example, the network environment 104 can include a gateway 118 that allows the computing systems of the network environment 104 to access a public network 122, such as the Internet. Likewise, for instance, the computing systems 116 can be connected to other computing systems of the network environment 104 by a wireless access point 118. One skilled in the art will realize that the network environment 104 can include any type of conventional network hardware that allows the computing systems of the network environment to communicate with one another.

Additionally, the network environment 104 can be connected to and communicate with one or more partner networks 123. The partner networks 123 can be separate from the network environment 104 but provide computing services to the network environment 104. For example, the partner networks 123 can provide services such as email hosting (e.g. Google™ mail), document storage services (e.g. Google docs), website hosting services, cloud computing services (e.g. Google cloud, Amazon™ EC2, etc.). One skilled in the art will realize that the partner networks 123 can be any type of computing systems and networks that can provide computing services to the network environment 104.

The computing systems and network hardware in the environment 100 can be located at any location, whether located at single geographic location or remotely located from each other. For example, the network environment 104 can represent the systems and hardware of a company that is located in multiple geographic locations. As such, one or more of the computing systems and network hardware can be located at one location (e.g. one office of the company) and one or more of the computing systems and network hardware can be located at one or more different locations (e.g. satellite offices of the company).

In embodiments, the owners, administrators, and users of the network environment 104 can desire to identify any security risks or threats in the network environment 104. To achieve this, the RA tool 102 can be utilized to identify attack surface of the network environment 104 and to assess the security risks that the attack surface poses. The attack surface of the network environment 104 includes any access point, component, software, data, and the like of the network environment 104, which potentially poses a security risk to the network environment 104, by allowing an attacker to potentially gain access to the network environment 104. For example, the attack surface of the network environment 104 can include the computing systems (e.g. file servers 106, web servers 108, application servers 110, database servers 112, email servers 113, computing systems 114, computing systems 116, etc.) and network hardware (e.g. gateway 118, wireless access point 120, etc.) of the network environment 104. The attack surface of the network environment 104 can also include the software installed and/or stored on the computing systems and network hardware of the network environment 104. Additionally, the attack surface of the network environment 104 can include services and information that are hosted and maintained by the computing systems and network hardware, such as web pages, email addresses, network forums, and the like. Also, the attack surface of the network environment 104 can include the computing services provided by the one or more partner networks 123.

To begin reconnaissance of the network environment 104, the RA tool 102 can be configured to receive base information about the network environment 104. The base information can include any basic information that describes the network environment 104. For example, the base information can include a name of the entity associated with the network environment 104 (e.g. company or corporation name), names of personnel using the network environment 104 (e.g. essential employees names), basic network information for the network environment 104 (e.g. key network addresses, key hostnames, key network address ranges, etc). The RA tool 102 can be configured to receive the base information from a person associated with the network environment 104, for example, an administrator of the network environment 104. For example, the RA tool 102 can be configured to create and output command line interfaces and/or graphical user interfaces (GUIs) that allow a user to enter the base information.

Once the base information is received, the RA tool 102 can be configured to perform the reconnaissance using the base information in order to identify the attack surface of the network environment 104. To identify the attack surface of the network environment 104, the RA tool 102 can be configured to utilize reconnaissance procedures and agents on the network environment 104 and to utilize reconnaissance procedures and agents on other sources external to the network environment 104 in order to identify the attack surface of the network environment 104. The reconnaissance procedures and agents can include procedures and agents that determine the attack surface by scanning, searching, querying, and/or interrogating the computing systems and network hardware of the network environment 104. For example, the reconnaissance procedures can include performing network analysis on the structure of the network environment 104 (e.g. BGP maps analysis, traceroutes, web crawling, wireless access point search, etc.) to identify all the computing systems and network hardware of the network environment 104. Likewise, for example, the reconnaissance procedures can include searching the computing systems and network hardware to identify any services and information (e.g. websites, email addresses) hosted by the network environment 104. Additionally, for example, the reconnaissance agents can include software programs or code that execute on the computing systems and network hardware of the network environment 104 (e.g. network taps, phishing agents) to identify the attack surface of the network environment 104.

Likewise, the RA tool 102 can be configured to utilize reconnaissance procedures and agents on other sources external to the network environment 104 based on the base information in order to identify the attack surface of the network environment 104. The external sources can be third party databases 124 and search engines 126 (e.g. Linkedin, Google, Facebook™, whois, etc.) that can include information about the attack surface of the network environment 104. For example, the RA tool 102 can search the third party databases 124 and the search engines 126 based on the name of the entity and personnel associated with the entity in order to identify the attack surface such as websites, email addresses, etc.

Additionally, the external sources can also be the partner networks 123 that can provide computing services to the network environment 104. For example, the reconnaissance procedures can include performing network analysis on the structure of the network environment 104 to identify any computing services provided by the partner networks 123. Likewise, for example, the reconnaissance procedures can include searching the partner networks 123 to identify any services and information (e.g. websites, email addresses) hosted by the partner networks 123. Additionally, for example, the reconnaissance agents can include software programs or code that executes on the partner networks 123 to identify the attack surface of the network environment 104.

The RA tool 102 can be configured to automatically utilize all the reconnaissance procedures and agents available. Likewise, the RA tool 102 can be configured to allow the user of the RA tool 102 to select particular reconnaissance procedures and agents to utilize. For example, the RA tool 102 can be configured to create and output command line interfaces and/or GUIs that display available reconnaissance procedures and agents and that allow the user to select the reconnaissance procedures and agents to utilize.

Once the RA tool 102 has identified the attack surface of the network environment 104, the RA tool 102 can be configured to automatically select and perform security assessments on the attack surface. The RA tool 102 selects the security assessment that matches a type of a part of the attack surface. For example, if the RA tool 102 identifies a website connected to the network environment 104, the RA tool 102 can select a web scanner and a vulnerability assessment scanner to assess the identified website. Likewise, for example, if the RA tool 102 identifies a group of unencrypted documents, the RA tool 102 can be configured to select a data leakage prevention (DLP) tool to insure there is no data leakage. Additionally, for example, if the RA tool 102 identifies a set of email addresses, the RA tool 102 can invoke a social engineering penetration testing tool to conduct phishing attacks for more information. The RA tool 102 can be configured to select and perform any type of known security assessments on the attack surface, such as web scanner, vulnerability assessment scanners, penetration testing tools, DLP tools, social engineering penetration test, and the like.

In addition to automatically selecting and performing the security assessment, the RA tool 102 can be configured to display the attack surface of the network environment 104 and the available security assessments to perform on the attack surface to the user of the RA tool 102. For example, the RA tool 102 can be configured to create and output command line interfaces and/or GUIs that display the attack surface of the network environment 104 and the available security assessments to perform on the attack surface. The RA tool 102 can be configured to allow the user select a particular part of the attack surface to assess and the security assessment to perform.

Once the RA tool 102 has completed the security assessments, the RA tool 102 can be configured to display the results of the security assessments to the user of the RA tool 102. The results can include an indication if parts of the attack surface are a security threat. The RA tool 102 can also include other information, for example, details of the security threat and a ranking of the security threat. For example, the RA tool 102 can be configured to create and output command line interfaces and/or GUIs that display the results of the security assessments.

Additionally, the RA tool 102 can be configured to utilize the results of the security assessments to perform additional reconnaissance. During the security assessment, the RA tool 102 can identify additional information about the network environment 104. For example, the RA tool 102 can identify additional network information (e.g. network addresses, network address ranges, hostnames, etc.), names of additional personnel associated with the network environment 104, and the like. If additional information is identified, the RA tool 102 can be configured to perform reconnaissance based on the additional information in order to identify additional parts of the attack surface of the network environment 104. If the additional parts of the attack surface are identified, the RA tool 102 can be configured to select and perform security assessments on the additional attack surface. For example, if the RA tool 102 performs a security assessment on the file servers 106 and discovers a reference to files being hosted by the partner networks 123, the RA tool 102 can perform additional reconnaissance on the partner networks 123 based on the discovered reference to determine additional parts of the attack surface and perform additional security assessments.

The RA tool 102 can be configured to iteratively perform any of number of additional reconnaissance and security assessments if any additional information is discovered. For example, if further information is identified during the additional reconnaissance and security assessments, the RA tool 102 can again perform further reconnaissance and security assessments based on the further information.

In embodiments, as described above, the RA tool 102 can be configured as an application program that is capable of being stored on and executed by a computing system, whether part of the network environment 104 or external to the network environment 104. The RA tool 102 can be written in a variety of programming languages, such as JAVA, C++, Python code, Visual Basic, hypertext markup language (HTML), extensible markup language (XML), and the like to accommodate a variety of operating systems, computing system architectures, etc.

In embodiments, as described herein, the RA tool 102 can be implemented and executed on any of the computing systems of network environment 104. Likewise, the RA tool 102 can be implemented and executed on a remote computing system connected to the network environment 104 by the network 122. When configured as an application program, the RA tool 102 can be stored on any type of computer readable storage medium, such as hard drives, optical storage, system memory, and the like, of the computing systems.

Figure 2:
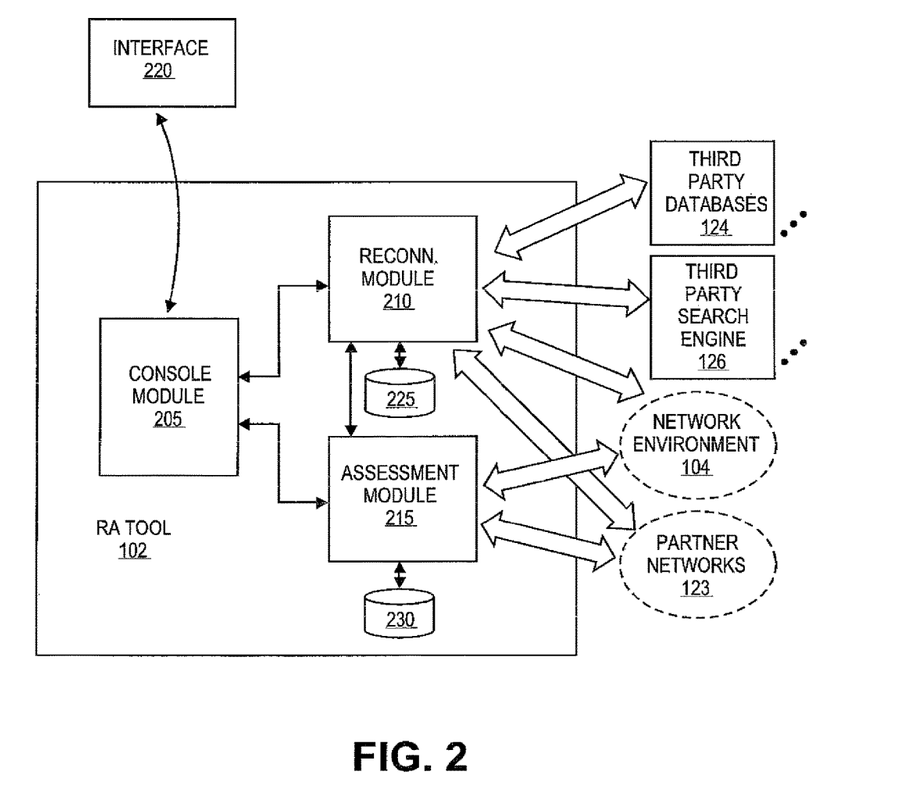
FIG. 2 is a block diagram of an exemplary configuration of the reconnaissance and assessment tool, according to various embodiments.

FIG. 2 is a block diagram of an exemplary configuration of the RA tool 102. As illustrated, the RA tool 102 can include a console module 205, a reconnaissance module 210, and an assessment module 215. While FIG. 2 illustrates various components of the RA tool 102, one skilled in the art will realize that existing components can be removed or additional components added.

The console module 205 can be configured to provide an interface 220 to the RA tool 102. The console module 205 can be configured to generate the interface 220 that allows a user to initiate the RA tool 102, operate the RA tool 102, such as enter base information about the network environment 104, select reconnaissance procedures, select security assessments, etc., and receive information generated by the RA tool 102, such as the attack surface of the network environment 104 and results of the security assessments. To achieve this, the console module 205 can be configured to include the necessary logic, commands, instructions and routines to generate and communicate with GUIs and/or command line interfaces. Likewise, the console module 205 can be configured include the necessary logic, commands, instructions and routines to output information in other formats, such as email, HTML document, text or word processing document, and the like.

The console module 205 can communicate with the reconnaissance module 210. The reconnaissance module 210 can be configured to perform the reconnaissance procedures and/or to utilize and communicate with the reconnaissance agents in order to identify the attack surface of the network environment 104. To achieve this, the reconnaissance module 210 can be configured to include the necessary logic, commands, instructions and routines to communicate with a reconnaissance database 225. The reconnaissance database 225 can be configured to store the reconnaissance procedures and reconnaissance agents utilized by the RA tool 102. Likewise, the reconnaissance module 210 can be configured to include the necessary logic, commands, instructions and routines to communicate with the network environment 104, the third party databases 124, the third party search engines 126, and the partner networks 123 to perform the reconnaissance procedures and to utilize the reconnaissance agents.

The console module 205 and the reconnaissance module 210 can be configured to communicate with the assessment module 215. The assessment module 215 can be configured to perform security assessments on any part of the attack surface identified by the reconnaissance module 210. To achieve this, the assessment module 215 can be configured to include the necessary logic, commands, instructions and routines to communicate with an assessment database 230. The assessment database 230 can be configured to store the security assessments utilized by the RA tool 102. The assessment database 230 can also be configured to store the types of the parts of the attack surface that are associated with the stored security assessments. The assessment module 215 can be configured to include the necessary logic, commands, instructions and routines to search the assessment database 230 to identify the security assessments that match the types of the parts of the attack surface and to automatically select appropriate security assessments that match the types of the parts of the attack surface. Likewise, the assessment module 215 can be configured to include the necessary logic, commands, instructions and routines to communicate with the network environment 104 to perform the security assessments.

In embodiments, the assessment module 215 can be configured to utilize heuristics and expert systems to automatically select the appropriate security assessments that best match the types of the parts of the attack surface. To achieve this, the assessment module 215 can be configured to include the necessary logic, commands, instructions and routines to perform analysis based on heuristics and expert systems techniques, algorithms, and rules in order to automatically select the appropriate security assessments that best match the types of the parts of the attack surface.

In embodiments, as illustrated in FIG. 2, the console module 205, the reconnaissance module 210, and the assessment module 215 can be implemented in a single application program capable of executing on a computing systems of environment 100. Likewise, the console module 205, the reconnaissance module 210, and the assessment module 215 can be implanted as separate application programs that are capable of executing on separate computing systems of the environment 100. In any implementation, the RA tool 102 can be stored any type of computer readable storage medium, such as hard drives, optical storage, system memory, and the like, of the computing systems of the environment 100.

Figure 3:
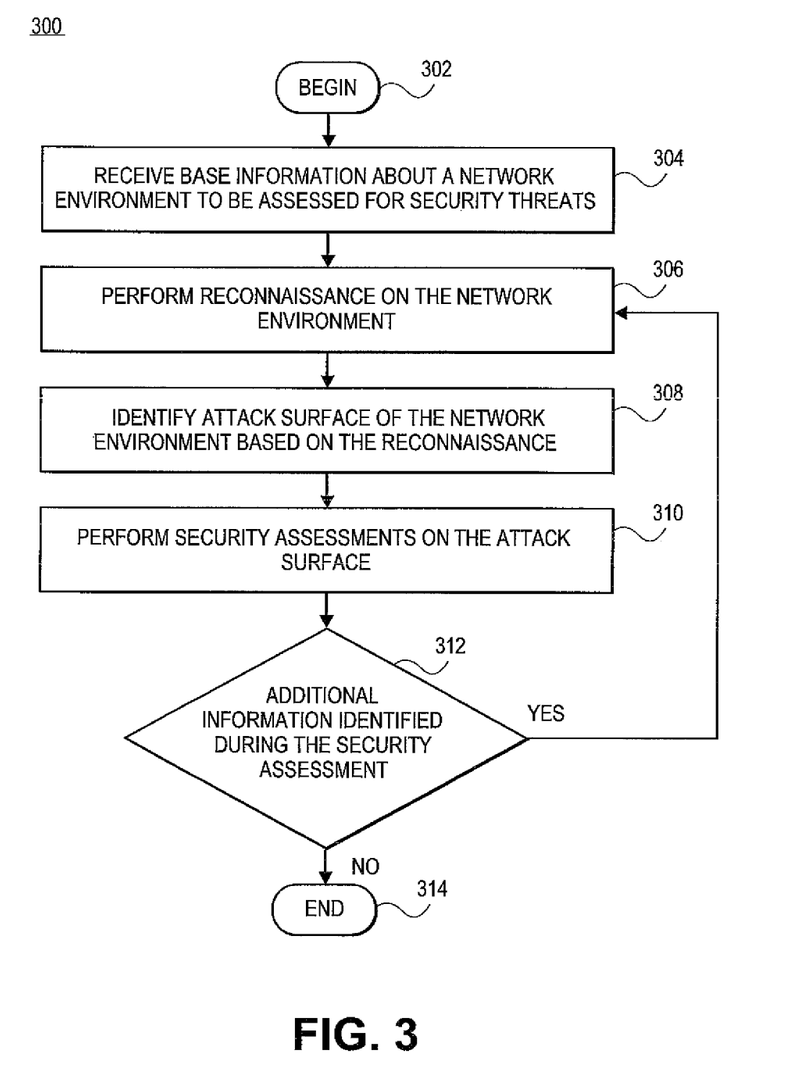
FIG. 3 is a flow diagram of exemplary processes performed by the reconnaissance and assessment tool, according to various embodiments.

As mentioned above, the RA tool 102 can be configured to perform reconnaissance and security assessments on the network environment 104. FIG. 3 is a flow diagram that illustrates an exemplary process by which RA tool 102 can reconnaissance and security assessments on the network environment 104. In 302, the process can begin.

In 304, the RA tool 102 can base information about the network environment 104 to be assessed for security threats. The base information can include any basic information that describes the network environment 104. For example, the base information can include a name of the entity associated with the network environment 104 (e.g. company or corporation name), names of personnel using the network environment 104 (e.g. essential employees names), basic network information for the network environment 104 (e.g. key network addresses, key hostnames, key network address ranges, etc). The RA tool 102 can be configured to receive the base information from a person associated with the network environment 104, for example, an administrator of the network environment 104.

In 306, the RA tool 102 can perform the reconnaissance on the network environment 104. The RA tool 102 can utilize reconnaissance procedures and agents on the network environment 104 and utilize reconnaissance procedures and agents on other sources external to the network environment 104 in order to identify the attack surface of the network environment 104. The reconnaissance procedures and agents can include procedures and agents that determine the attack surface by scanning, searching, querying the computing systems and network hardware of the network environment 104. For example, the reconnaissance procedures can include performing network analysis on the structure of the network environment 104 (e.g. BGP maps analysis, traceroutes, web crawling, wireless access point search, etc.) to identify all the computing systems and network hardware of the network environment 104. Likewise, for example, the reconnaissance procedures can include searching the computing systems and network hardware to identify any services and information (e.g. websites, email addresses) hosted by the network environment 104. Additionally, for example, the reconnaissance agents can include software programs or code that execute on the computing systems and network hardware of the network environment 104 (e.g. network taps, phishing agents) to identify attack surface of the network environment 104.

Likewise, the RA tool 102 can utilize reconnaissance procedures and agents on other sources external to the network environment 104 based on the base information in order to identify the attack surface of the network environment 104. The external sources can be third party databases 124 and search engines 126 (e.g. Linkedin, Google, Facebook, whois, etc.) that can include information about the attack surface of the network environment 104. For example, the RA tool 102 can search the third party databases 124 and the search engines 126 based on the name of the entity and personnel associated with the entity in order to identify parts of the attack surface such as websites, email addresses, etc.

Additionally, the external sources can also be the partner networks 123 that can provide computing services to the network environment 104. For example, the reconnaissance procedures can include performing network analysis on the structure of the network environment 104 to identify any computing services provided by the partner networks 123.

Likewise, for example, the reconnaissance procedures can include searching the partner networks 123 to identify any services and information (e.g. websites, email addresses) hosted by the partner networks 123. Additionally, for example, the reconnaissance agents can include software programs or code that executes on the partner networks 123 to identify the attack surface of the network environment 104.

In 308, from the reconnaissance, the RA tool 102 can identify the attack surface of the network environment. The attack surface of the network environment 104 includes any access point, component, software, data, and the like of the network environment 104, which potentially poses a security risk to the network environment 104, by allowing an attacker to potentially gain access to the network environment 104. For example, the attack surface of the network environment 104 can include the computing systems (e.g. file servers 106, web servers 108, application servers 110, database servers 112, email servers 113, computing systems 114, computing systems 116, etc.) and network hardware (e.g. gateway 118, wireless access point 120, etc.) of the network environment 104. The attack surface of the network environment 104 can also include the software installed and/or stored on the computing systems and network hardware of the network environment 104. Additionally, the attack surface of the network environment 104 can include services and information that are hosted and maintained by the computing systems and network hardware, such as web pages, email addresses, network forums, and the like. Also, the attack surface of the network environment 104 can include the computing services provided by the one or more partner networks 123.

In 310, the RA tool 102 can perform security assessments on the attack surface. The RA tool 102 can select and perform the security assessments that match a type of a part of the attack surface. For example, if the RA tool 102 identifies a website connected to the network environment 104, the RA tool 102 can select a web scanner and a vulnerability assessment scanner to assess the identified website. The RA tool 102 can select and perform any type of known security assessments on the attack surface, such as web scanner, vulnerability assessment scanners, penetration testing tools, data leakage prevention tools, social engineering penetration test, and the like.

The RA tool 102 can automatically select and perform security assessments on the attack surface. In addition to automatically selecting and performing the security assessment, the RA tool 102 can display the attack surface of the network environment 104 and the available security assessments to perform on the attack surface to the user of the RA tool 102, and the user of the RA tool 102 can select the security assessments to be performed.

In 312, the RA tool 102 can determine if additional information was identified during the security assessment. If additional information was identified, the RA tool 102 can perform additional reconnaissance and security assessments based on additional information determined during the security assessments. During the security assessment, the RA tool 102 can identify additional information about the network environment 104. For example, the RA tool 102 can identify additional network information (e.g. network addresses, network address ranges, hostnames, etc.), names of additional personnel associated with the network environment 104, and the like. If additional information is identified, the RA tool 102 can perform reconnaissance based on the additional information in order to identify additional parts of the attack surface of the network environment 104. If additional parts of the attack surface are identified, the RA tool 102 can select and perform security assessments on the additional parts of the attack.

In 314, the process can end, return to any point or repeat.

Figure 4:
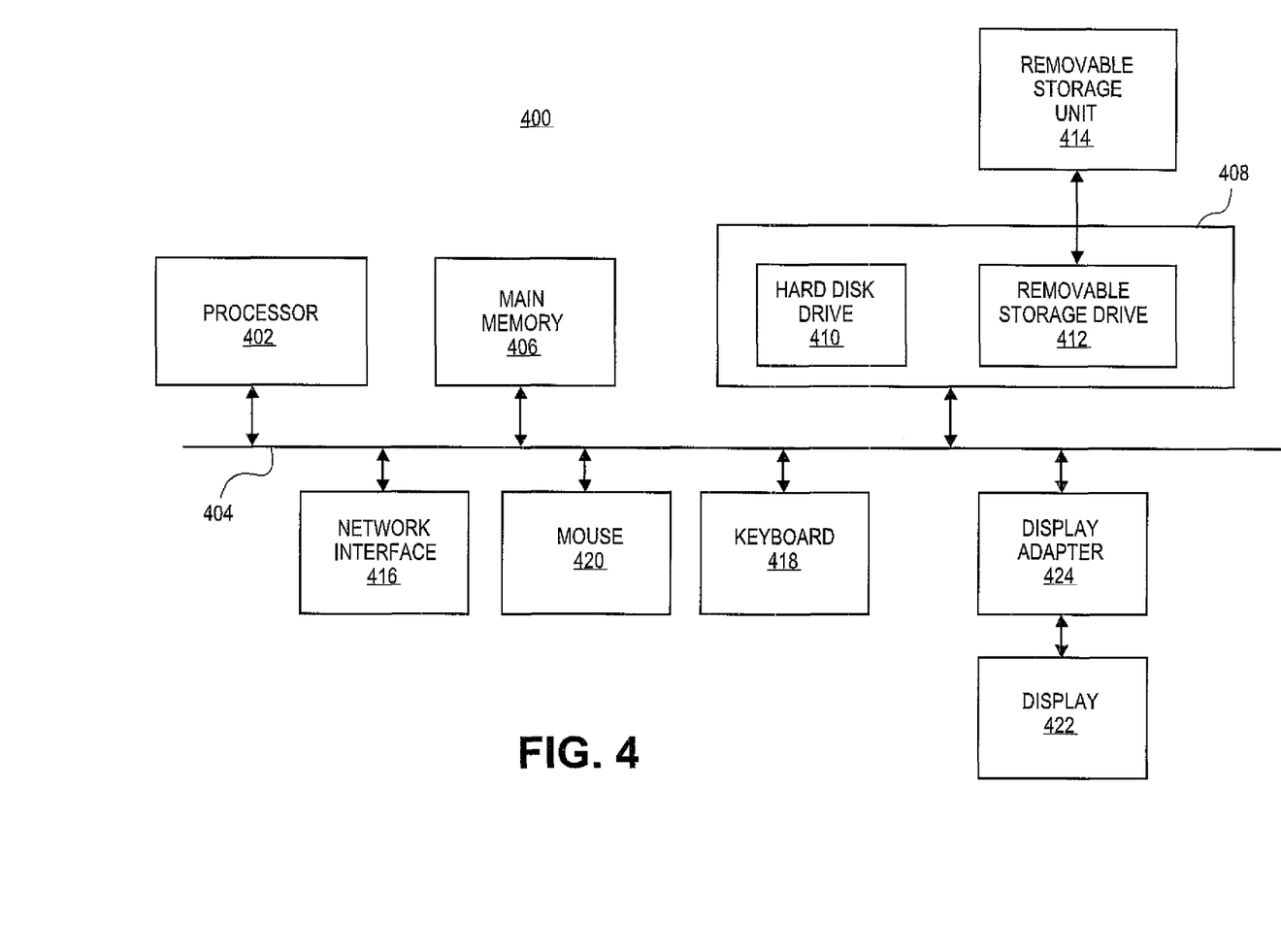
FIG. 4 is a block diagram of an exemplary computing system, according to various embodiments.

FIG. 4 illustrates an exemplary block diagram of a computing system 400 which can be implemented to store and execute the RA tool 102 according to various embodiments. In embodiments, the RA tool 102 can be stored and executed on the computing system 400 in order to perform the process described above. The computing systems 400 can represent an example of any computing systems in the environment 100. While FIG. 4 illustrates various components of the computing system 400, one skilled in the art will realize that existing components can be removed or additional components can be added.

As shown in FIG. 4, the computing system 400 can include one or more processors, such as processor 402 that provide an execution platform for embodiments of the RA tool 102. Commands and data from the processor 402 are communicated over a communication bus 404. The computing system 400 can also include a main memory 406, for example, one or more computer readable storage media such as a Random Access Memory (RAM), where the RA tool 102 and other application programs, such as an operating system (OS) can be executed during runtime, and can include a secondary memory 408. The secondary memory 408 can include, for example, one or more computer readable storage media or devices such as a hard disk drive 410 and/or a removable storage drive 412, representing a floppy diskette drive, a magnetic tape drive, a compact disk drive, etc., where a copy of a application program embodiment for the RA tool 102 can be stored. The removable storage drive 412 reads from and/or writes to a removable storage unit 414 in a well-known manner. The computing system 400 can also include a network interface 416 in order to connect with any type of network, whether wired or wireless.

In embodiments, a user can interface with the computing system 400 and operate the RA tool 102 with a keyboard 418, a mouse 420, and a display 422. To provide information from the computing system 400 and data from the RA tool 102, the computing system 400 can include a display adapter 424. The display adapter 424 can interface with the communication bus 404 and the display 422. The display adapter 424 can receive display data from the processor 402 and convert the display data into display commands for the display 422.

Certain embodiments may be performed as a computer application or program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include computer readable storage devices and media, and signals, in compressed or uncompressed form. Exemplary computer readable storage devices and media include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present teachings can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the teachings has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Furthermore, to the extent that the terms "including", "includes", "having", "has", "with", or variants thereof are used in either the detailed description and the claims, such terms are intended to be inclusive in a manner similar to the term "comprising." As used herein, the term "one or more of" with respect to a listing of items such as, for example, A and B, means A alone, B alone, or A and B. Those skilled in the art will recognize that these and other variations are possible within the spirit and scope as defined in the following claims and their equivalents.

What is claimed is:

1. A computer-implemented method to assess security threats, comprising:
   receiving base information for a network that comprises entity information and network information associated with the network;
   performing a security reconnaissance process on the network by scanning the network to identify a computing entity that is part of the entity information, and based on the identity of the computing entity, searching the network and an external source in a partner network for a network component that is unrecorded or unidentified in the network information;
   determining, based on the security reconnaissance process and the base information indicating that the network component is associated with the computing entity, an attack surface of the network that comprises one or more parts, using a security reconnaissance agent executing in the partner network of the external source;
   identifying a part of the one or more parts of the attack surface based on the network information associated with the computing entity and the network component indicating that the part matches a first security threat assessment; and
   performing the first security threat assessment by evaluating the part of the attack surface for one or more security vulnerabilities followed by a second security threat assessment on one or more other parts of the attack surface in the partner network of the external source that match the second security threat assessment based on the network information updated with the identity of the network component that was previously unrecorded or unidentified if at least one of the one or more security vulnerabilities are discovered during the first security threat assessment.

2. The computer-implemented method of claim 1, wherein
   the security reconnaissance agent scans the network using Border Gateway Protocol (BGP) maps analysis, traceroutes, web crawling, or wireless access point search, and
   the security reconnaissance agent executes on one or more network taps or one or more phishing agents to determine the attack surface.

3. A non-transitory computer readable storage medium comprising program instructions executable to:
   receive base information for a network that comprises entity information and network information associated with the network;
   perform a security reconnaissance process on the network by scanning the network to identify a computing entity that is part of the entity information, and based on the identity of the computing entity, searching the network and an external source in a partner network for a network component that is unrecorded or unidentified in the network information;
   determine, based on the security reconnaissance process and the base information indicating that the network component is associated with the computing entity, an attack surface of the network that comprises one or more parts, using a security reconnaissance agent executing in the partner network of the external source;
   identify a part of the one or more parts of the attack surface based on the network information associated with the computing entity and the network component indicating that the part matches a first security threat assessment; and
   perform the first security threat assessment by evaluating the part of the attack surface for one or more security vulnerabilities followed by a second security threat assessment on one or more other parts of the attack surface in the partner network of the external source that match the second security threat assessment based on the network information updated with the identity of the network component that was previously unrecorded or unidentified if at least one of the one or more security vulnerabilities are discovered during the first security threat assessment.

4. The non-transitory computer readable storage medium of claim 3, wherein
   the security reconnaissance agent scans the network using Border Gateway Protocol (BGP) maps analysis, traceroutes, web crawling, or wireless access point search, and
   the security reconnaissance agent executes on one or more network taps or one or more phishing agents to determine the attack surface.

5. A system to assess security threats comprising:
   one or more processors; and
   a memory coupled to the one or more processors, wherein the memory stores program instructions executable by the one or more processors to:
   receive base information for a network that comprises entity information and network information associated with the network;
   perform a security reconnaissance process on the network by scanning the network to identify a computing entity that is part of the entity information, and based on the identity of the computing entity, searching the network and an external source in a partner network for a network component that is unrecorded or unidentified in the network information;
   determine, based on the security reconnaissance process and the base information indicating that the network component is associated with the computing entity, an attack surface of the network that comprises one or more parts, using a security reconnaissance agent executing in the partner network of the external source;
   identify a part of the one or more parts of the attack surface based on the network information associated with the computing entity and the network component indicating that the part matches a first security threat assessment; and perform the first security threat assessment by evaluating the part of the attack surface for one or more security vulnerabilities followed by a second security threat assessment on one or more other parts of the attack surface in the partner network of the external source that match the second security threat assessment based on the network information updated with the identity of the network component that was previously unrecorded or unidentified if at least one of the one or more security vulnerabilities are discovered during the first security threat assessment.

6. The system of claim 4, wherein the security reconnaissance agent scans the network using Border Gateway Protocol (BGP) maps analysis, traceroutes, web crawling, or wireless access point search, and the security reconnaissance agent executes on one or more network taps or one or more phishing agents to determine the attack surface.

\* \* \* \* \*